C. WANINGER.
GEARING.
APPLICATION FILED JAN. 25, 1913.
1,072,282.
Patented Sept. 2, 1913.
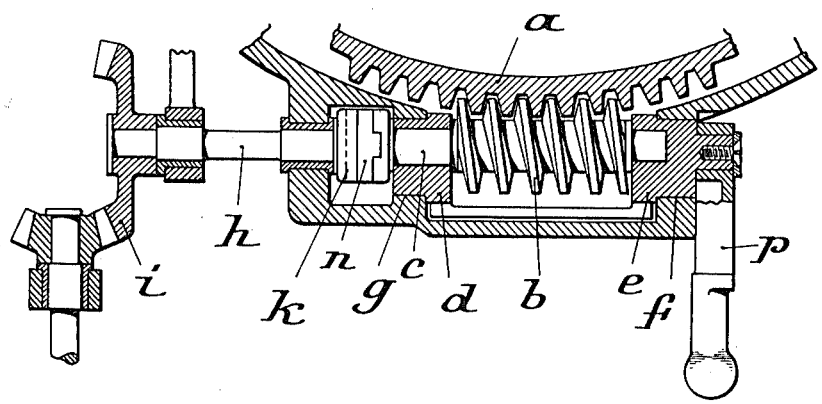
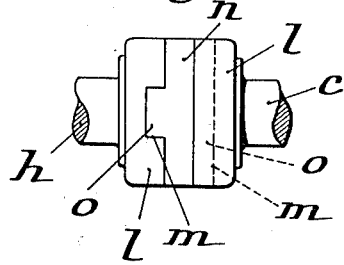
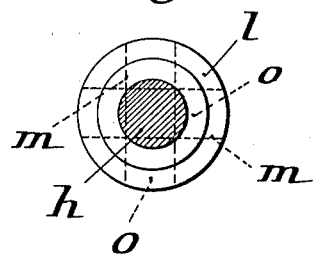
WITNESSES
INVENTOR

UNITED STATES PATENT OFFICE.

CARL WANINGER, OF DUSSELDORF, GERMANY, ASSIGNOR TO RHEINISCHE METALL-WAAREN- UND MASCHINENFABRIK, OF DUSSELDORF-DERENDORF, GERMANY, A CORPORATION OF GERMANY.

GEARING.

1,072,282.   Specification of Letters Patent.   Patented Sept. 2, 1913.

Application filed January 25, 1913. Serial No. 744,103.

*To all whom it may concern:*

Be it known that I, CARL WANINGER, a subject of the German Emperor, residing at 128 Verdingenstrasse, Dusseldorf, Germany, have invented certain new and useful Improvements in Gearing; and I do hereby declare the following to be a full, clear, and exact description of the invention, such as will enable others skilled in the art to which it appertains to make and use the same.

In order to secure disengagement of worm gearing it is customary, in some instances, to turn the worm about an eccentrically disposed axis, but heretofore when the worm shaft has been very long it has been necessary to support it at various points.

The primary object of my invention is to provide simple and highly efficient means whereby the worm shaft can be thrown out of engagement and render unnecessary the use of additional bearings for the extension of the worm shaft, and a further object is to enable that portion of the shaft carrying the worm to be thrown out of engagement without disturbing the remaining portion of the shaft.

In the accompanying drawings, Figure 1 is an elevation, with parts in section. Fig. 2 is a detail and Fig. 3 is a similar view at right angles thereto.

Referring to the drawings, $a$ designates a worm wheel which gears with the worm $b$ mounted on a shaft $c$ eccentrically journaled in sleeves $d$ and $e$, these sleeves having a rigid connection and fitting in bearings $f$ and $g$ of a suitable housing. The axes of the sleeves $d$ and $e$ are eccentric to the axis of the worm shaft $c$, as before stated, so that when the sleeves are rotated the worm will be thrown out of engagement with wheel $a$.

In line with the worm shaft is an extension $h$ thereof which projects beyond the housing, and which is shown as carrying a bevel-gearing $i$. The worm shaft $c$ and the extension shaft $h$ are connected by a sliding coupling $k$, which comprises two corresponding disks $l$ mounted one on the shaft $c$ and the other on the shaft $h$, and having grooves $m$ at right angles to each other. Between the two disks $l$ is an intermediate coupling disk $n$, which is provided on its opposite sides with tongues $o$ fitting in the grooves $m$. When the sleeves $d$, $e$, are rotated by hand lever $p$, connected to sleeve $e$, only the worm shaft $c$ is turned about the eccentric axis, that is to say, either the inner disk $l$ slides relatively to the coupling disk $n$, or such inner disk $l$ and the coupling disk $n$ slide relatively to the outer disk $l$. In either event the worm shaft $c$ is turned about the eccentric axis without disturbing the extension shaft $h$.

I claim as my invention:

1. A worm shaft having eccentric bearings, a second shaft forming an extension of the worm shaft, and a sliding coupling between the two shafts whereby the worm shaft may be rotated about an eccentric axis without interfering with the extension shaft.

2. A worm shaft having eccentric bearings, a second shaft forming an extension of the worm shaft, and a coupling between the two shafts comprising members slidable at right angles to the axis of the extension shaft whereby the worm shaft may be rotated about an eccentrically-disposed axis without disturbing the extension shaft.

3. A worm shaft having eccentric bearings, a second shaft forming an extension of the worm shaft, and a coupling between the two steps comprising two corresponding disks having grooves at right angles to each other and an intermediate disk having tongues fitting in said grooves, whereby the worm shaft may be rotated about an eccentrically-disposed axis without disturbing the extension shaft.

In testimony whereof, I have signed this specification in the presence of two subscribing witnesses.

CARL WANINGER. [L. S.]

Witnesses:
 ALBERT NUFER,
 WALLSDEN SOMMET.